US 6,567,379 B1

(12) United States Patent
Walker et al.

(10) Patent No.: US 6,567,379 B1
(45) Date of Patent: May 20, 2003

(54) TRAFFIC MONITOR USING LEAKY BUCKET WITH VARIABLE FILL

(75) Inventors: David S. Walker, San Jose, CA (US); Daniel R. Ullum, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/328,702

(22) Filed: Jun. 9, 1999

(51) Int. Cl.[7] .................. G01R 31/08; H04L 12/28; H04L 12/54
(52) U.S. Cl. .............. 370/235.1; 370/389; 370/428; 370/395.32
(58) Field of Search ................. 370/389, 392, 370/395.31, 400–402, 428–429, 235, 235.1, 423, 390, 396, 395.32, 229; 709/238, 224, 234, 235, 245, 232

(56) References Cited

U.S. PATENT DOCUMENTS

| | | | | |
|---|---|---|---|---|
| 5,274,631 A | * | 12/1993 | Bhardwaj | 370/401 |
| 5,473,607 A | * | 12/1995 | Hausman et al. | 370/392 |
| 5,615,340 A | * | 3/1997 | Dai et al. | 370/419 |
| 5,790,799 A | * | 8/1998 | Mogul | 709/224 |
| 5,852,607 A | * | 12/1998 | Chin | 370/401 |
| 6,094,435 A | * | 7/2000 | Hoffman et al. | 370/414 |
| 6,118,760 A | * | 9/2000 | Zaumen et al. | 370/389 |
| 6,295,299 B1 | * | 9/2001 | Haddock et al. | 370/423 |
| 6,381,649 B1 | * | 4/2002 | Carlson | 370/235 |

* cited by examiner

Primary Examiner—Kwang Bin Yao
Assistant Examiner—Hanh Nguyen
(74) Attorney, Agent, or Firm—Campbell Stephenson Ascolese LLP

(57) ABSTRACT

An integrated circuit monitors the most active traffic flow rates on a communications network by using a leaky bucket model having a variable fill rate. As a switch receives packets, the packet identifications are sampled. A sampled packet identification is compared to record identifications in a table of identifications. If the sampled and record identifications match, an activity value for the packet identification is increased by an amount inversely proportional to an activity value associated with the record identification. If the sampled and record identifications do not match, the activity value is decreased. Record identifications are removed from the table when the activity value decreases to a specified level. New sampled identifications are added to the table if empty records exist.

32 Claims, 5 Drawing Sheets

Microfiche Appendix Included
(1 Microfiche, 47 Pages)

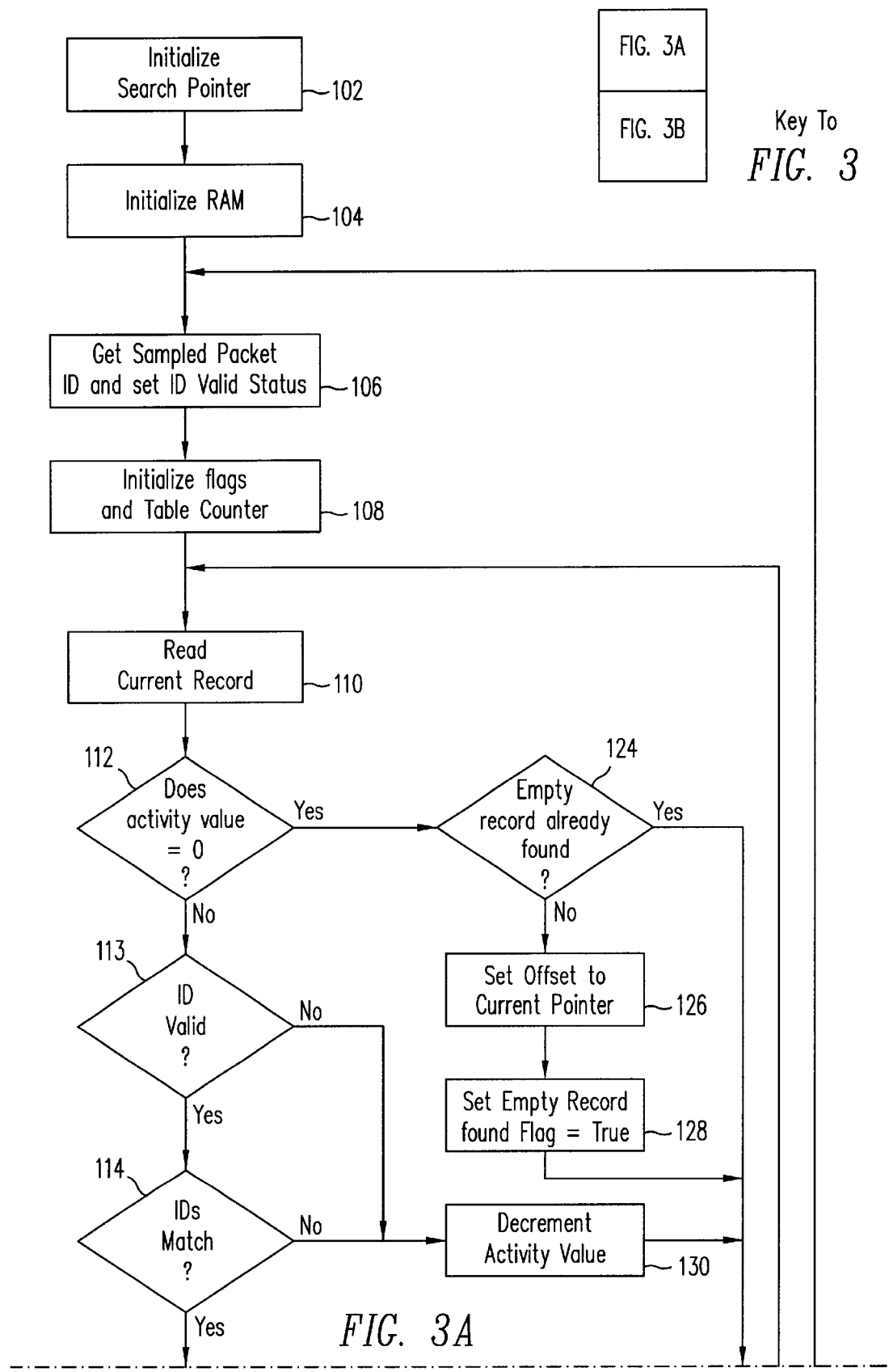

TRAFFIC MONITOR USING LEAKY BUCKET WITH VARIABLE FILL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

This specification contains a microfiche appendix in two parts A and B. The microfiche appendix consists of one (1) microfiche having 47 frames.

BACKGROUND

1. Field of the Invention

The invention relates to determining the most active traffic flow rates among many on a communications network and, in particular, to using an integrated circuit configured to create a table indicating flow rates for particular packet address identifications.

2. Related Art

FIG. 1 shows a block diagram of a switch 10 in a typical network 12. As shown, a plurality of sources 14A and 14B, destinations 16A and 16B, and source/destination combinations 18A and 18B are connected to switch 10. Switch 10 may receive a signal from source 14A on line 20 which represents information contained in a typical packet form using a conventional Media Access Control (MAC) addressing protocol. Switch 10 receives the signal, examines the destination address identification in the packet, and directs the packet be sent using a second signal on, for example, line 22 to the correct destination such as destination 16B.

It is of interest to monitor the traffic activity through a network device, such as switch 10, so that the most active packet addresses are identified. Packet activity may be of interest for many network related reasons, including administration and maintenance requirements such as reconfiguration. Thus selected source addresses, destination addresses, and source/destination pair addresses may be of particular interest. Traffic activity is presently monitored using a remote device such as an RMON (Remote Monitor) Probe. This device is separate from switch 10.

What is desired is an apparatus and method of identifying the packet identifications most frequently handled by a switch or other network device that is integral to the device itself. It is furthermore desirable that the apparatus be embodied in a single integrated circuit.

SUMMARY

In an embodiment of the invention, an integrated circuit is configured to act as a monitor that uses a modified "leaky bucket" model to distinguish the most active packet identifications handled by a network device such as a switch. In one embodiment the monitor creates a traffic activity table in random access memory (RAM) that contains the identification and an associated traffic activity value for each of the most active packet address identifications. The table contains a fixed number of available records, and each record has a field for a unique packet identification and a field for an associated activity value (a "bucket" associated with each identification).

The monitor periodically samples identifications of packets received by a switch. The sampled packet identification is stored in a buffer and is sequentially compared against each record in the traffic activity table. For each sampled packet identification, all activity table records are examined once. If the sampled identification matches an identification in the activity table, the associated activity value is increased (the bucket begins to fill). If the sampled identification does not match an identification in the current table record, the table record identification's associated activity value is decreased (the bucket leaks). Over time, if an activity value decreases to zero, the record is considered empty. If the sampled identification does not match any identification in the table, and if an empty record exists in the table, the sampled identification is placed in an empty record in the table and an initial value is assigned to its associated activity value.

The rate at which the activity values are increased and decreased is significant. For each comparison in which the sampled identification does not match a current table record identification, the matching activity value is decreased by a fixed amount (the bucket leaks at a fixed rate). But if a sampled identification matches a current table record identification, the matching activity value is increased by an amount inversely proportional to the activity value (the bucket is filled at a rate inversely proportional to the current bucket contents). The relationship between the inversely variable increase amount and the constant decrease amount yields an activity value upper limit that indicates how often a particular packet identification is being sampled (the inversely proportional fill rate and the constant leak rate signifies that for a particular number of times a particular packet identification is sampled, the bucket can only fill to a specified level). Conversely, a particular packet sample rate may be indicated by choosing a specified increase amount and upper limit corresponding to the particular packet sample rate (a particular packet's activity reaches a particular minimum when the bucket fills to a certain level).

The monitor increases the activity values using addends stored in a look up table. The addend table contains discrete activity value upper limits and a unique addend for each upper limit. Thus, if a sampled identification matches an existing identification in the activity table, the monitor examines the activity table's associated activity value, looks to the addend table to find the range in which the activity value falls, and determines the appropriate addend. The monitor then adds the addend to the current activity value and updates the current activity table record with the new activity value.

If a particular packet identification has been added to the activity table, but is not subsequently sampled, the matching activity value will eventually decrease to zero. When the activity value decreases to zero, the monitor considers the record containing the associated identification to be empty and places a new sampled identification in the activity table. The result is that the activity table is constantly updated and contains an activity value for the most significant packet identifications handled by the switch.

In one embodiment the monitor is implemented in an application specific integrated circuit (ASIC) contained in a network switch. The ASIC contains RAM, in which the activity table and other volatile information such as the sampled packet's identification is stored, and other circuits configured to perform the monitoring tasks in accordance with the present invention. The ASIC is connected to an external central processing unit, clock, and information busses.

The monitor ASIC is constructed using conventional techniques. In one embodiment the monitor circuits are specified using the VERILOG language and compiled using SYNOPSYS from a catalog of available circuits. The ASIC is then fabricated using conventional procedures and is installed in the switch for normal operation. In other embodiments a computer or other device is configured to implement the monitoring tasks in accordance with the invention. Computer readable media may be configured to store computer implemented instructions in accordance with the method of the present invention.

BRIEF DESCRIPTION OF THE DRAWINGS

FIGS. 3A and 3B combined are a flow diagram outlining a traffic monitoring process implemented in accordance with one embodiment of the invention.

DETAILED DESCRIPTION

Identically numbered elements in the accompanying drawings represent the same element. The term "switch" is used in this specification to describe equipment used to direct information over a network based on address information. Those skilled in the art will understand that such equipment includes, for example, switches and routers. For example, a switch may direct an information packet based on address information contained within the packet. However, embodiments of the present invention are not limited to use in a switch, but may be used at any point in a network. Thus, the term "network" as used herein is to be broadly construed to mean any communication system in which carried information has a characteristic subject to monitoring. Embodiments are described using positive addends and activity values, but negative numbers may also be used.

Figure 1:
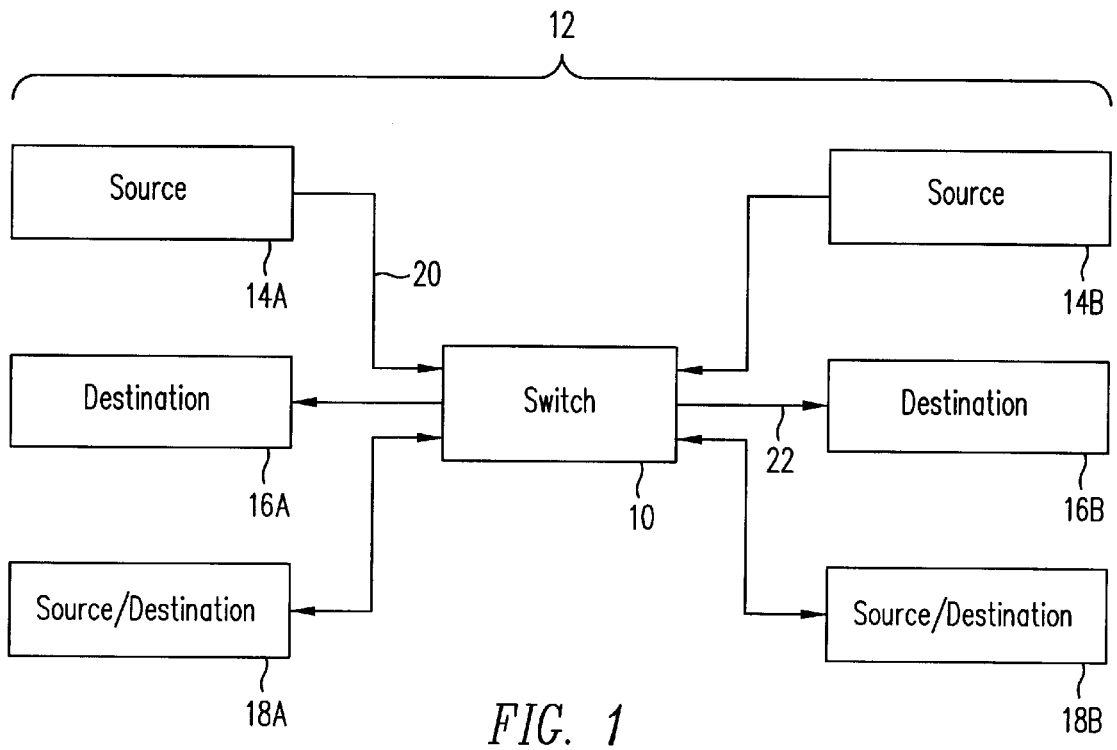
FIG. 1 is a block diagram showing network components.
Figure 2:
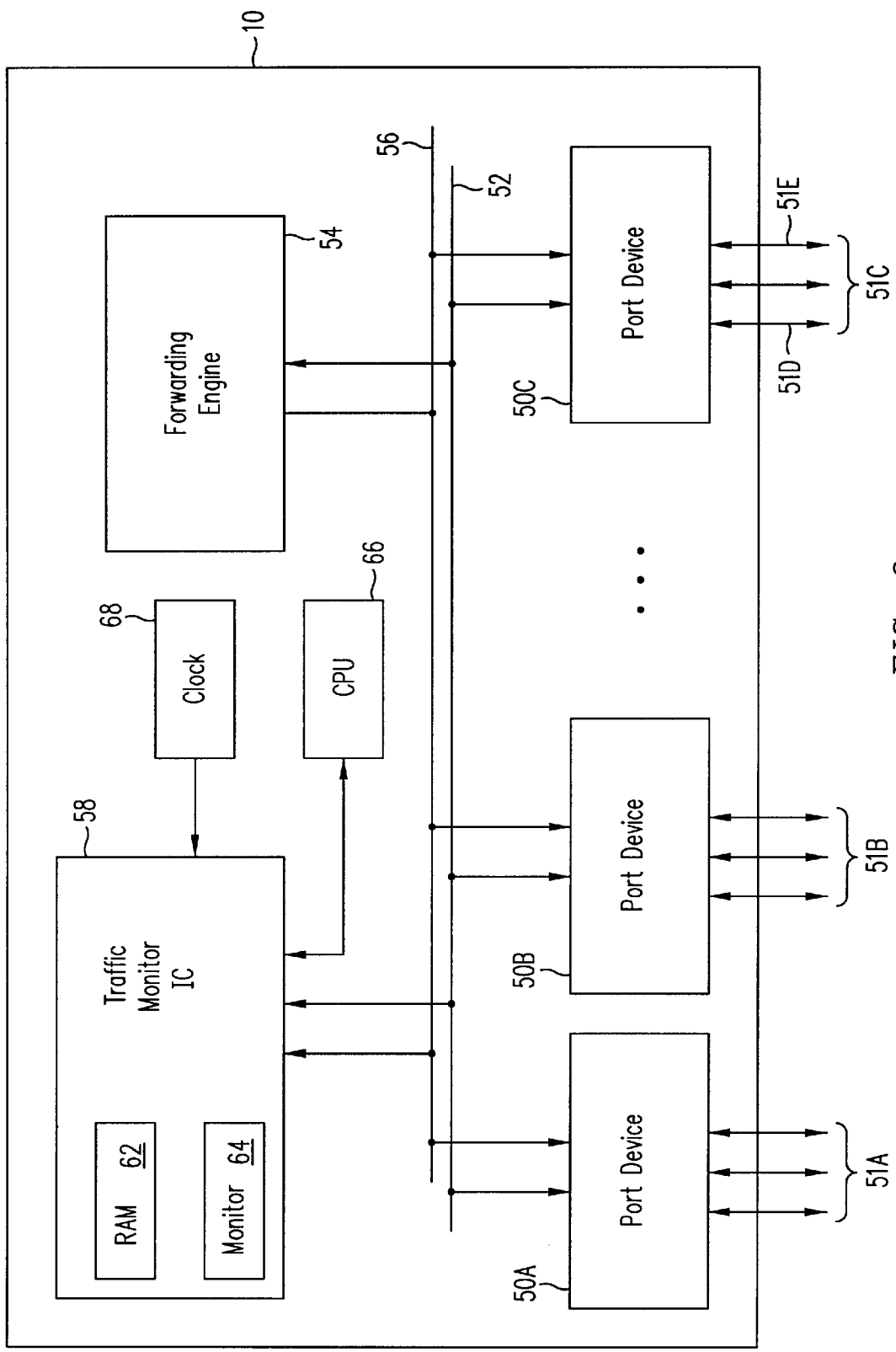
FIG. 2 is a block diagram showing selected components of a switch, including an embodiment of the invention, used in a network.

One embodiment of the present invention is an application specific integrated circuit (ASIC) used in a network switch, such as switch 10 in FIG. 1. FIG. 2 is a block diagram showing components of switch 10. As shown, switch 10 contains a plurality of port devices 50A, 50B, and 50C. Each individual port device 50A, 50B, and 50C has a plurality of input/output ports represented by arrows 51A, 51B, and 51C respectively. Each port in each port device is connected to a particular source, destination, or combined source and destination (FIG. 1).

Switch 10 contains a data bus (DBUS) 52 to which port devices 50A–C are connected. A signal containing a packet may be directed to switch 10 via a particular port 51D, for example. A signal received by a particular port device can be transferred to DBUS 52 and signals on DBUS 52 can be accessed by one or more components of switch 10. For example, switch 10 contains conventional forwarding engine 54 connected to DBUS 52. Forwarding engine 54 receives a data signal representing an information packet from DBUS 52 and determines the packet's proper address identification. After determining the packet's address identification, forwarding engine 54 places a response signal on response bus (RBUS) 56, connected to port devices 50A–C. The response signal directs one of port devices 50A–C to direct the packet out a port 51E, for example, towards a destination specified in the packet's address. The packet information signal may be directed out any port or ports in any port device or devices in switch 10.

In accordance with the present invention, traffic monitor integrated circuit (IC) 58 is also connected to DBUS 52 and RBUS 56. In the embodiment shown, IC 58 is application specific and contains random access memory (RAM) 62 and monitor circuits 64. IC 58 is configured to act as a sampler, a comparator, and a controller to implement a process that provides information regarding traffic flow rates on DBUS 52 as described in detail below. The information is stored as a traffic activity table in RAM 62.

The activity table contains packet address identification and relative activity values for each address identification in the table. The term "identification" as used in describing this embodiment means a source address, destination address, or source/destination address pair for a particular packet. For embodiments described below, conventional Media Access Control (MAC) addresses are monitored. Other addressing protocols or other information signal characteristics may be monitored using embodiments of the present invention.

In one embodiment, the table has a depth of 256 records. Other table depths may be used, and the significance of table depth is described below. TABLE 1 illustrates an activity table having 256 records. Each record contains a field for a packet identification and a separate field for an activity value associated with the packet identification. Manipulation of unique packet identifications and their associated activity values within the activity table is described in detail below.

TABLE 1

| Record Number | Packet Identification | Activity Value |
| --- | --- | --- |
| 0 | ID #1 | xxx |
| 1 | ID #2 | xxx |
| 2 | ID #3 | xxx |
| . | . | . |
| . | . | . |
| . | . | . |
| 253 | — | 0 |
| 254 | — | 0 |
| 255 | — | 0 |

FIG. 2 also shows central processing unit (CPU) 66 and clock 68 connected to IC 58. As described below, CPU 66 provides information and instructions to IC 58, and clock 68 provides clock pulses used during IC 58 operation. In one embodiment the clock is set at 62.5 MHz.

Figure 3B:
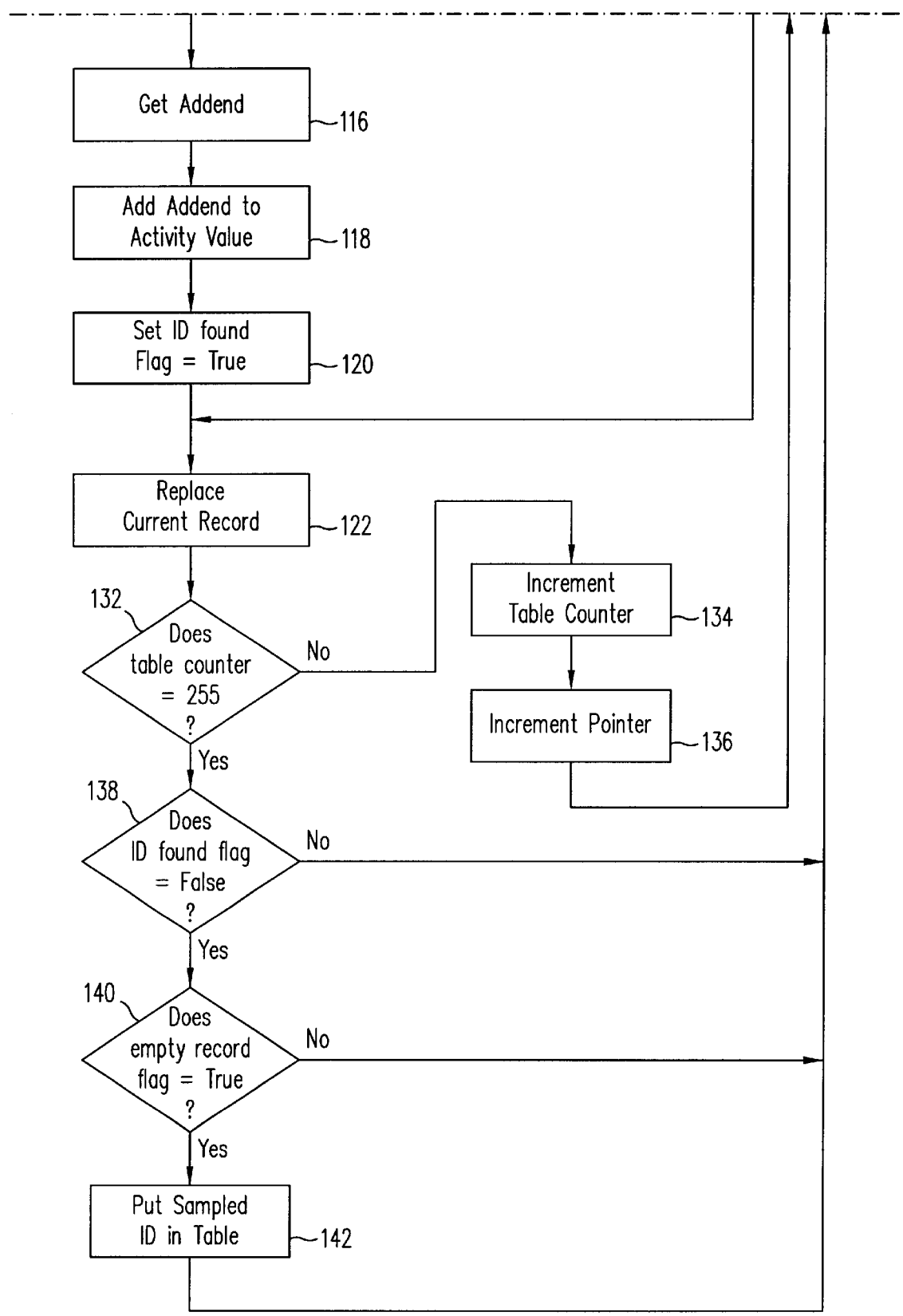

FIGS. 3A and 3B combined are a flow diagram representing tasks performed by a traffic monitor in accordance with the invention. These tasks correspond to code shown in the accompanying microfiche appendix.

Referring to FIG. 3A, a search pointer is initialized in step 102. Next, RAM 62 (FIG. 2) is initialized in step 104. Both steps 102 and 104 are performed only once during a particular monitoring session. The remaining steps are performed as the monitor loops through the task flow as described below.

All activity value fields are set to zero when RAM is initialized. A zero activity value signifies that the record number is considered empty and may receive a new packet identification and associated activity value. As described below, an active packet identification is placed into an empty activity table record and has an activity value assigned during traffic monitor operation. As described below, if a particular packet identification activity ceases, the corresponding activity value eventually decreases to zero, the particular identification is "timed out" from the activity table, and a new, more active packet identification is put in its place. Details of these procedures are discussed below.

In one embodiment the search pointer (initialized in step 102) points to the last activity table record. The exact record at which the pointer begins is not important, as long as the pointer eventually points to each activity table record. The monitor uses the search pointer to sequentially access each record in the activity table as it compares packet identification in the table to packet identifications being received by switch 10.

Rather than track activity for every packet switch 10 receives, the monitor periodically samples identifications of received packets. The monitor may sample source, destination, or source/destination pair address identifications. As described in detail below, the monitor compares the sampled identification with the identification stored in each activity table record. Thus, the monitor requires one sampled address each time it "walks through" all activity table records. The monitor may sample identifications in various ways.

In one embodiment the monitor samples a received packet address identification using one of two modes. The monitor selects a sampling mode by referring to a binary bit state in RAM 62 as written by CPU 66 in switch 10 (FIG. 2). In the "fixed" sampling mode, the monitor samples DBUS 52 for a packet address after completing an activity table walk through. If a packet identification exists on DBUS 52 at sampling time, the monitor stores the sampled identification in RAM 62, and sets an identification valid flag to true. If no packet signal exists on DBUS 52 at the sampling time, the monitor waits for a specified time. If a valid packet arrives on DBUS 52 during the specified time, the monitor takes the received identification as a sample, stores the identification in RAM, and sets the identification valid flag to true. If no packet has arrived after the specified time expires, however, the monitor sets the identification valid flag to false. After sampling a valid address identification, or having waited the specified time, the monitor once again walks through the table and continues the procedure as described below.

In a second, preferred "random" sampling mode, the monitor samples DBUS 52 for a packet identification at a random time while performing the table walk-through. If a valid address identification is sampled, the identification valid flag is set to true. If no valid address identification is sampled, the monitor sets the identification valid flag to false. As soon as the monitor completes one table walk-through process, the monitor once again walks through the activity table regardless of whether a valid sampled identification exists for comparison. The advantage of the random sampling mode is that it avoids the possibility of sampling a particular packet address coincident with the packet's periodic arrival time, yet ensures that sampling occurs at a fixed average rate.

Referring again to FIG. 3A, in step 106 the monitor samples the packet identification and sets the identification valid flag as appropriate, as just described. When no valid packet address is sampled, the previously sampled address remains in RAM (or the initialization value remains if no identification is sampled immediately after startup). A false identification valid flag alerts the monitor to ignore the sampled identification during activity table identification comparisons.

The traffic monitor sequentially compares the sampled packet identification against each identification stored in the activity table records. The monitor's search pointer points to each activity table record in turn. The monitor uses a record number counter to indicate that an activity table record has been examined. When the record number counter value reaches the number of table records (the table depth), the monitor has examined each table record and then samples a new packet identification.

In step 108 the table record counter is set to zero. In addition, in step 108 an "identification found" flag and "empty record" flag are each set to false.

As the monitor walks through the activity table records, the activity table record actively being examined is referred to as the current record. In step 110 the monitor reads the current record and determines the current record's current identification and current activity value.

In step 112, the monitor checks the current activity value to see if it equals zero. If the activity value does not equal zero, the current record contains information regarding an active traffic identification, and the monitor continues to step 113.

Referring now to FIG. 3A, in step 113 the monitor checks if the sampled identification is valid by checking the identification valid flag status. If the identification is not valid, the monitor proceeds to step 130 which is described below. If valid, the monitor continues to step 114 and compares the sampled identification to the current identification in the current activity table record. If the sampled identification matches the current identification, this signifies that the sampled identification continues to be one of the more active identifications. Therefore, an addend is determined in step 116, and the addend is added to the current activity value in step 118.

In one embodiment, the appropriate addend is selected from a lookup table as shown in TABLE 2 below. The lookup table is stored in RAM 62 so that CPU 66 may alter the stored values (FIG. 2). In other embodiments the lookup table values may be stored in nonvolatile memory or in other computer readable storage media. Or, the addend may be determined through direct calculation. As shown in TABLE 2 the values in the "Activity Value Upper Limit" column represent ranges in which the current activity table record's current activity value may fall. The corresponding value in the "Addend" column represents the corresponding addend the monitor will use when a current activity value falls within one of the specified ranges. For example, if the current activity value associated with a particular identification in the activity table is greater than 1540 but less than 2048, the monitor selects 43 as an addend.

In the embodiment shown in TABLE 2, there is no corresponding sampled percent less than 0.78. Based on simulations, there is little significant traffic flow rate distinction between activity values less than 256 and those between 256 and 512. For example, simulations show an identification that is sampled at slightly above 0.39 percent nevertheless will often have an activity value of less than 256. Therefore, a 0.39 corresponding sampled percent was omitted from this embodiment. Other embodiments may include a corresponding sampled percent entry of 0.39 or similar number.

TABLE 2

| Activity Value Upper Limit | Addend | Corresponding Sampled Percent |
|---|---|---|
| Initial Value | 255 | |
| 512 (2td) | 256 (td) | |
| 1024 (4td) | 128 (td/2) | 0.78 |
| 1540 (6td) | 64 (td/4) | 1.6 |
| 2048 (8td) | 43 (td/6) | 2.3 |
| 3072 (12td) | 32 (td/8) | 3.1 |
| 4096 (16td) | 21 (td/12) | 4.8 |
| 6144 (24td) | 16 (td/16) | 6.3 |
| 8192 (32td) | 11 (td/24) | 9.0 |
| 12288 (48td) | 8 (td/32) | 12.5 |
| 16384 (64td) | 6 (td/48) | 16.7 |
| 24576 (96td) | 4 (td/64) | 25.0 |
| 32768 (128td) | 3 (td/96) | 33.3 |
| 57344 (224td) | 2 (td/128) | 50.0 |
| 14th Register | 1 (td/224) | 100.0 |

Figure 4:
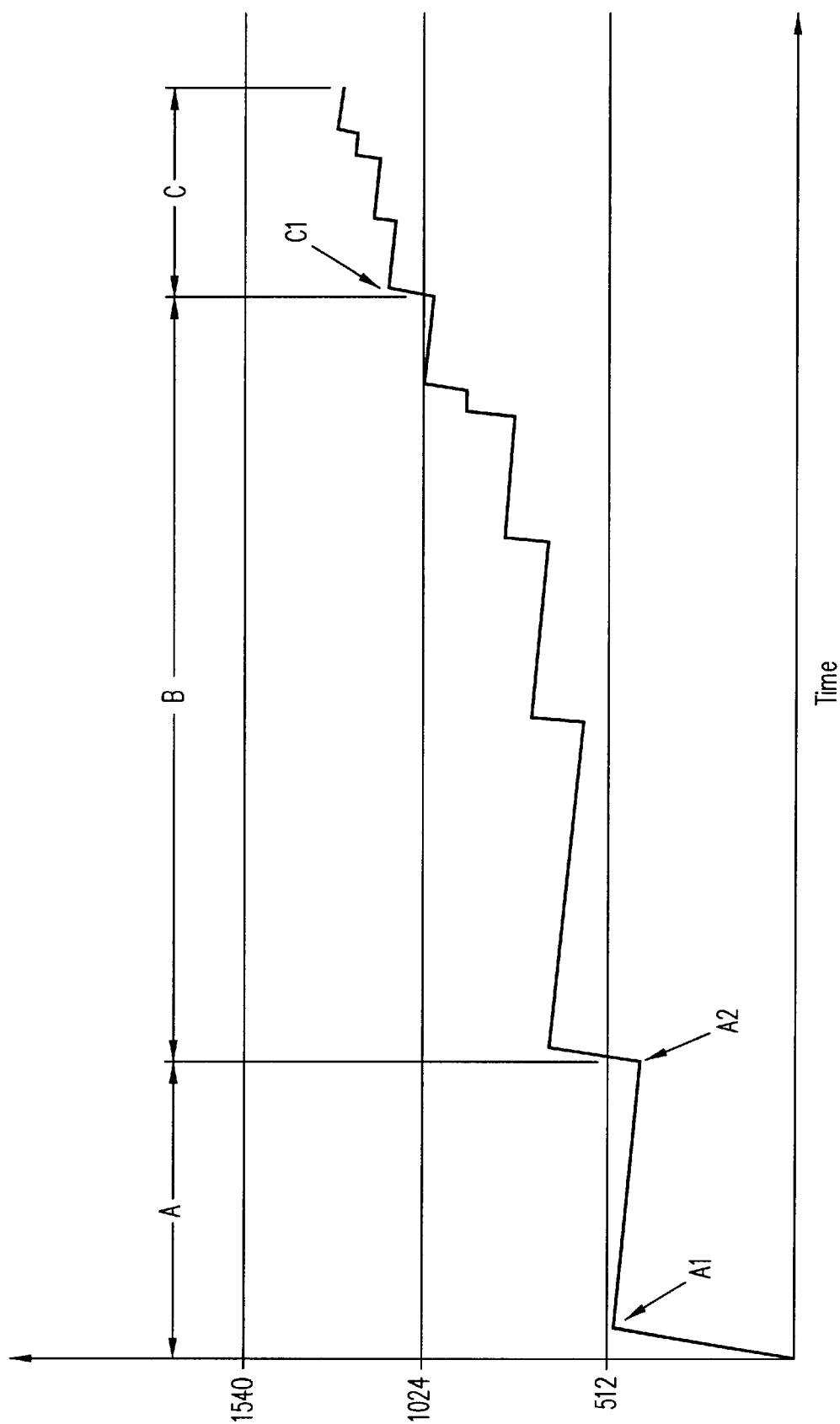
FIG. 4 is a graph showing an example relationship between an activity value and time.

The addend values to be selected in step 116 are varied to be inversely proportional to the current activity value. In this way, increasingly active packet identifications will have associated activity values that rise in progressively smaller increments. Thus, for a constant rate of decrease for the activity value as described below, and for a given rate at which the monitor samples a particular identification, the identification's associated activity value will stay below a selected upper value. FIG. 4 illustrates monitor operation using values shown in TABLE 2.

FIG. 4 is a graph in which the abscissa represents time (or sampling intervals) and the ordinate represents a current record's current activity value. As shown in interval A, the monitor initially samples a new identification twice so that the corresponding activity value is 511 at point A1 (255 initial value+256 addend). The activity value then decreases over time because the monitor does not sample the corresponding identification, as described below, until reaching point A2 at which time the monitor again samples the matching identification. The current activity value is less than 512 and the monitor once again selects 256 as an addend from the lookup table. The monitor adds the addend to the current activity value so that the new current activity value is in the range 512 to 1024. This range signifies that the particular identification is being sampled at less than 0.78 percent of all packet identifications the monitor samples.

Still referring to FIG. 4, as the particular packet identification activity increases, the monitor begins to sample the identification more frequently in interval B. The identification's activity value continues its rising trend as the monitor now selects 128 as the appropriate addend. Once the activity value reaches point C1, the activity value has crossed the 1024 threshold which now indicates that the particular identification is being sampled at between 0.78 and 1.6 percent of all identifications being monitored. If the monitor continues to sample this particular identification between 0.78 and 1.6 percent of the time, the activity value will remain in the range between 1024 and 1540. If the monitor samples the particular identification more or less frequently, the associated activity value will move into a higher or lower range.

Both the individual addends and the activity value upper limit values may be varied. As shown for the embodiment in TABLE 2, the activity values and addends are based on the number of records in the traffic activity table. And as shown, the addends are selected so that the first sampled traffic flow indication occurs at just below one percent. In other embodiments, however, other activity value upper limit and addend values may be chosen to monitor other selected traffic rates.

The number of rows in TABLE 2 is selected to provide the number of distinct indications of traffic activity. The number of records therefore represents a granularity of the sampled identifications. In the embodiment shown, the number of intervals is selected as providing an acceptable number of indicated flow rates. In other embodiments, more or fewer ranges may be specified.

Referring again to FIG. 3B, the "identification found" flag is set to true in step 120 if the sampled identification matches the current identification in the table record. Then, in step 122 the current record's activity value is replaced with either the new increased activity value calculated in step 118, or the new decreased activity value calculated in step 130 as described below. In the embodiment shown, the current identification is refreshed in step 122 when the associated activity value is written.

Referring again to step 112 shown in FIG. 3B, if the current activity value equals zero, the current activity table record is considered empty. The monitor checks the "empty record" flag in step 124. If an empty record has already been found during a previous comparison between the sampled identification and an earlier table record, the monitor moves to step 122 as shown on FIG. 3B.

If an empty record has not been previously found, step 126 sets an offset value equal to the current pointer. The monitor uses the offset value to show the record number of the empty record. Then, the monitor sets the empty record flag to true in step 128, and moves to step 122.

Referring again to step 114 shown in FIG. 3B, if the sampled identification does not match the current identification, the monitor decreases the current activity value by a fixed value, as shown by step 130. In the embodiments shown in the microfiche appendix, the activity value is decreased by one (1), but other values may be specified. Thus, as the monitor walks through the activity table and examines each table record once per every sample, each activity table record containing a non-matching identification will have its corresponding activity value decreased.

Referring now to FIG. 3B, the monitor now performs step 132 and determines if all activity table records have been checked. If not, the monitor increments the table record counter in step 134, increments the pointer in step 136, and returns to step 110 to compare the sampled packet identification with the next activity table record using the procedure described above.

If the monitor determines in step 132 that all activity table records have been checked, it next determines if the sampled packet identification should be added to the activity table. As shown in step 138, if the sampled identification was found in an activity table record, the monitor returns to step 106 (FIG. 3A) and gets a new sampled packet identification. If the sampled identification was not found, however, the monitor performs step 140 and checks if the activity table contains an empty record. If the activity table contains an empty record, the monitor refers to the offset determined in step 126 (FIG. 3A) and puts the sampled identification and an initial activity value (TABLE 2) in the empty record. The monitor then returns to step 106 (FIG. 3A), samples another packet identification, and repeats the process as described above. In this way a table of active packet identifications and corresponding activity values is maintained in RAM 62 (FIG. 2).

Figure 5:
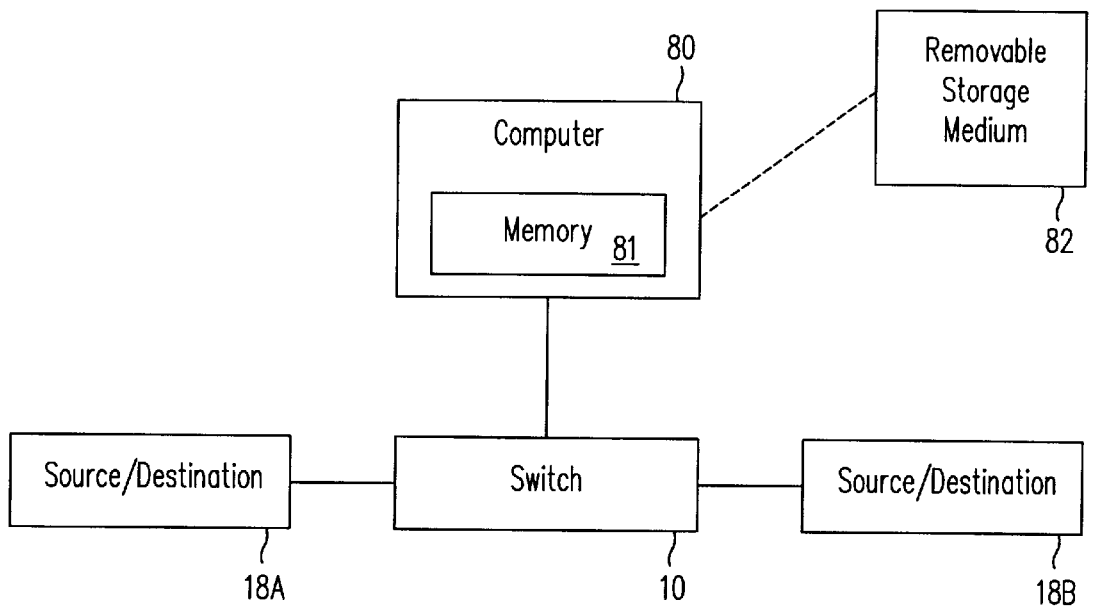
FIG. 5 is a block diagram of a computer implemented embodiment of the invention.

The present invention is not limited to the embodiment described above. For example, referring to FIG. 5, one embodiment may be a computer 80 configured to implement the process described above using instructions compiled from, for example, source code in the C language. As shown, computer 80 is connected to switch 10 by any conventional means. Computer 80 may thus receive information regarding the packet identifications being received by switch 10 or another network device, from source/destination address pairs 18A and 18B for example. Computer 80 may then implement computer readable instructions to monitor network traffic as described. Such computer readable instructions may be contained in memory 81 which may be RAM or nonvolatile storage. Such computer readable instructions may also be stored on any conventional removable computer storage medium 82.

Referring to the microfiche appendices, Microfiche Appendix A is a code representing a circuit design expressed in conventional VERILOG language which may, for example, be embodied in IC 58. The source code is compiled using a SYNOPSYS v. 8.3 compiler using conventional methods. In one embodiment the code was compiled to be manufactured by International Business Machines, Inc. using standard industry procedures.

TABLE 3 contains module and variable names or portions of names to assist the reader in understanding the code as shown.

TABLE 3

| NAME | INTERPRETATION |
| --- | --- |
| cp: | Central processing unit |
| dbm: | Debug monitor. Not used in the present invention. |
| lbvf: | Leaky bucket with variable fill |
| rm: | RAM |
| rs: | Remote monitor (RMON) statistics. |
| si: | Slave interface |
| sm: | State machine. The circuit representation as shown is controlled using a typical state machine function having four states: (1) wait, (2) update table, (3) new entry, and (4) weighted average (unrelated statistical method) |
| st: | State |
| sv: | Slave. Located on the data bus. |
| sv_rs_data: | Sampled packet id from the data bus; the naming convention shows the data is going from slave to RMON statistics. |
| td: | Table depth |
| ti_rs_top: | Top level control module |
| ti_rs_dbm: | Module contained in ti_rs_top |
| ti_rs_rc: | Module contained in ti_rs_top |
| ti_rs_rm: | Module contained in ti_rs_top |
| ti_rs_si: | Module contained in ti_rs_top |
| ti_rs_slave: | Module contained in ti_rs_top |
| ti_rs_sm: | Module contained in ti_rs_top |
| wait_timer_init: | Variable controlling sampling mode |

Microfiche Appendix B contains a code used to construct a simulation of an integrated circuit embodying the present invention.

Physical circuits in accordance with embodiments of the invention are conventional. As described above, one embodiment was constructed as an application specific integrated circuit. Persons skilled in the art, having reviewed this description, may also construct embodiments of the invention using other conventional techniques and components. Persons skilled in the art will therefore realize that the spirit and scope of the present invention exceeds the embodiments described above and that the invention is defined by the claims that follow.

We claim:

1. A communications network device comprising:
   a port configured to receive a communications signal from a source;
   a second port configured to transmit a second communications signal to a destination;
   a sampler that samples a signal characteristic;
   a comparator that compares the sampled signal characteristic to a record characteristic in a table of characteristics; and
   a controller that increases an activity value corresponding to the record characteristic if the sampled characteristic and the record characteristic match, and decreases the activity value if the sampled characteristic and the record characteristic do not match.

2. The device of claim 1 wherein the activity value corresponding to the record characteristic is increased by an amount depending on the activity value.

3. The device of claim 1 wherein the signal characteristic is address information within a packet.

4. The device of claim 1 wherein the sampled signal characteristic is made a record characteristic in the table of characteristics when the activity value has a specified value.

5. The device of claim 1 wherein a particular record characteristic is removed from the table of characteristics after the activity value corresponding to the particular record characteristic has a specified value.

6. The device of claim 1 wherein when the activity value has a first value, it is increased by a greater amount than when the activity value has a second value, the first value being less than the second value.

7. The device of claim 1 wherein the number of records in the table of characteristics corresponds to the rate at which the sampler samples a signal characteristic.

8. The device of claim 1 wherein the sampler, the comparator, and the controller form part of an integrated circuit.

9. The device of claim 1 wherein the sampler, the comparator, and the controller are a programmed computer.

10. A device for monitoring network activity comprising:
    a sampler that samples a signal characteristic;
    a comparator that compares the sampled signal characteristic to a record characteristic in a table of characteristics; and
    a controller that increases an activity value corresponding to the record characteristic if the sampled characteristic and the record characteristic match, and decreases the activity value if the sampled characteristic and the record characteristic do not match.

11. The device of claim 10 wherein the activity value corresponding to the record characteristic is increased by an amount depending on the activity value.

12. The device of claim 10 wherein the signal characteristic is address information within a packet.

13. The device of claim 10 wherein the sampled signal characteristic is made a record characteristic in the table of characteristics when the activity value has a specified value.

14. The device of claim 10 wherein a particular record characteristic is removed from the table of characteristics after the activity value corresponding to the particular record characteristic has a specified value.

15. The device of claim 10 wherein when the activity value has a first value it is increased by a greater amount than when the activity value has a second value, the first value being less than the second value.

16. The device of claim 10 wherein the number of records in the table of characteristics corresponds to the rate at which the sampler samples a signal characteristic.

17. The device of claim 10 wherein the sampler, the comparator, and the controller form part of an integrated circuit.

18. The device of claim 10 wherein the sampler, the comparator, and the controller are a programmed computer.

19. A computer readable storage medium configured with instructions for a computer implemented process comprising:

sampling a signal characteristic;

comparing the sampled signal characteristic to a record characteristic in a table of characteristics; and increasing an activity value corresponding to the record characteristic if the sampled characteristic and the record characteristic match, and decreasing the activity value if the sampled characteristic and the record characteristic do not match.

20. The medium of claim 19 wherein the activity value corresponding to the record characteristic is increased by an amount depending on the activity value.

21. The medium of claim 19 wherein the signal characteristic is address information in a packet.

22. The medium of claim 19 wherein the sampled signal characteristic is made a record characteristic in the table of characteristics when the activity value has a specified value.

23. The medium of claim 19 wherein a particular record characteristic is removed from the table of characteristics after the activity value corresponding to the particular record characteristic has a specified value.

24. The medium of claim 19 wherein when the activity value has a first value, it is increased by a greater amount than when the activity value has a second value, the first value being less than the second value.

25. The medium of claim 19 wherein the number of records in the table of characteristics corresponds to the rate at which the process samples a signal characteristic.

26. A process performed by a communications apparatus comprising:

sampling a signal characteristic;

comparing the sampled signal characteristic to a record characteristic in a table of characteristics; and increasing an activity value corresponding to the record characteristic if the sampled characteristic and the record characteristic match, and decreasing the activity value if the sampled characteristic and the record characteristic do not match.

27. The process of claim 26 wherein the activity value corresponding to the record characteristic is increased by an amount depending on the activity value.

28. The process of claim 26 wherein the signal characteristic is address information in a packet.

29. The process of claim 26 wherein the sampled signal characteristic is made a record characteristic in the table of characteristics when the activity value has a specified value.

30. The process of claim 26 wherein a particular record characteristic is removed from the table of characteristics after the activity value corresponding to the particular record characteristic has a specified value.

31. The process of claim 26 wherein when the activity value has a first value, it is increased by a greater amount than when the activity value has a second value, the first value being less than the second value.

32. The process of claim 26 wherein the number of records in the table of characteristics corresponds to the rate at which the process samples a signal characteristic.

* * * * *